(12) United States Patent
Wakabayashi et al.

(10) Patent No.: US 6,492,805 B1
(45) Date of Patent: Dec. 10, 2002

(54) WHEEL SPEED DETECTING DEVICE FOR A VEHICLE

(75) Inventors: Takeshi Wakabayashi, Saitama (JP); Makoto Igarashi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/675,087

(22) Filed: Sep. 29, 2000

(30) Foreign Application Priority Data

Sep. 30, 1999 (JP) .......................................... 11-279568
Jul. 19, 2000 (JP) ...................................... 2000-219608

(51) Int. Cl.[7] .................................................. G01P 3/48
(52) U.S. Cl. ....................................... 324/173; 324/160
(58) Field of Search ................................ 324/173, 174, 324/160, 163, 164, 165, 166, 207.13, 207.22, 207.25; 702/96, 44; 180/220

(56) References Cited

U.S. PATENT DOCUMENTS 3,792,460 A * 2/1974 Ratz ........................... 340/518
4,740,905 A * 4/1988 Murkami et al. ............. 702/96
5,027,303 A * 6/1991 Witte ........................... 702/44
5,257,540 A * 11/1993 Bower et al. ............. 73/379.07
5,480,348 A * 1/1996 Mazur et al. .................. 453/10
6,232,767 B1 * 5/2001 Kawase et al. ............. 324/174

FOREIGN PATENT DOCUMENTS

JP          8133154          5/1996

* cited by examiner

Primary Examiner—Edward Lefkowitz
Assistant Examiner—Subhash Zaveri
(74) Attorney, Agent, or Firm—Birch, Stewart, Kolasch & Birch, LLP

(57) ABSTRACT

To provide device capable of enhancing the detection accuracy of a wheel speed detecting device and reducing cost. A wheel speed detecting device for a rear wheel includes a pulsar ring mounted on a rear wheel hub, and a pulse counting sensor mounted on a swing arm. The pulsar ring includes a disc, and pulse detecting holes are formed at a predetermined pitch on a pitch circle drawn at a radially inward circumferential position spaced at a predetermined distance from the outer edge of the disc. The pulse detecting hole is formed in a position on the center side apart from the outer edge of the pulsar ring, leaving the outer edge of the pulsar ring in a circular form. Therefore, it is possible to prevent warpage of the pulsar ring by the outer edge portion if the pulse detecting holes are made by pressing.

18 Claims, 17 Drawing Sheets

Comparative example

Embodiment

FIG. 13(a)
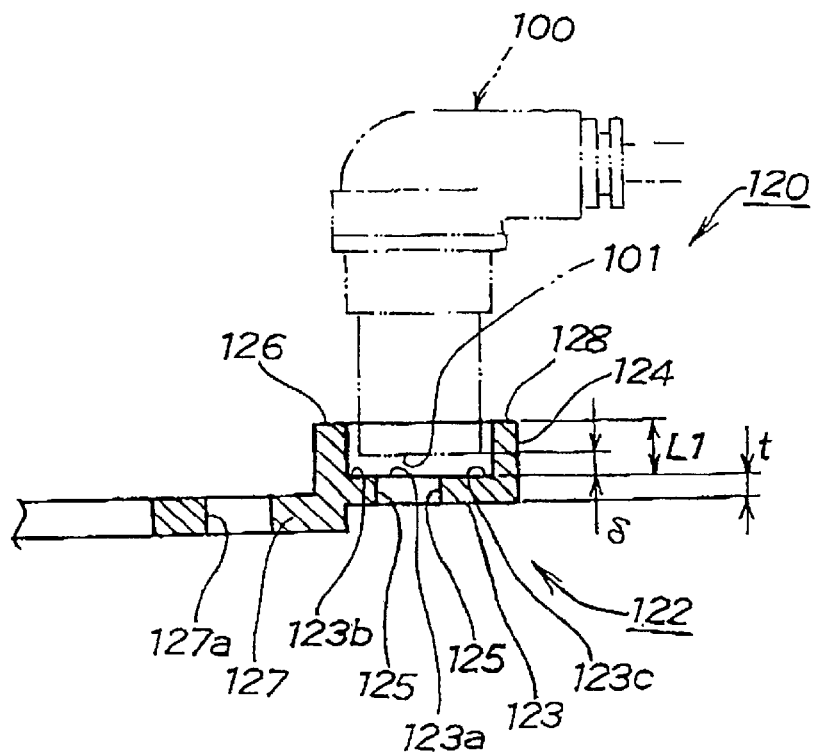
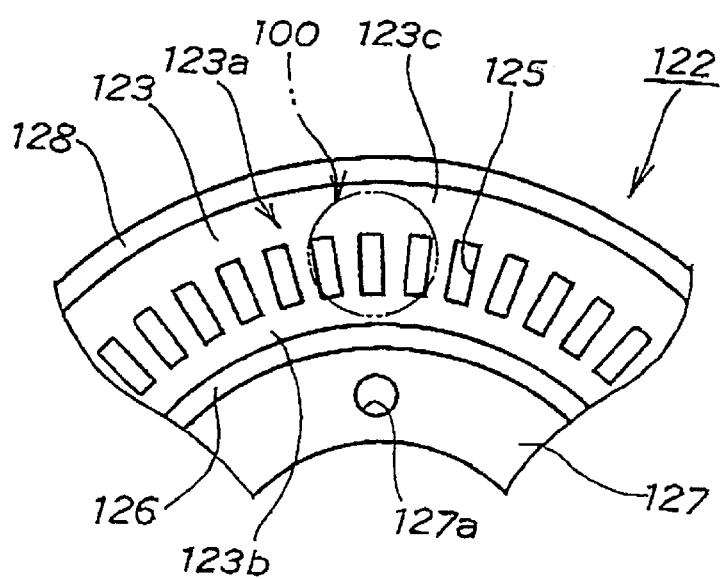
FIG. 13(b)

Comparative example

Embodiment

WHEEL SPEED DETECTING DEVICE FOR A VEHICLE

BACKGROUND OF THE INVENTION

1. Field of the Invention

This invention relates to a wheel speed detecting device which detects the rotational speed of a wheel.

2. Description of Related Art

Motorcycles adopting, for instance, an Antilock Brake System (ABS) are equipped with a wheel speed detecting device for detecting the rotational speed of front and rear wheels. As a background art wheel speed detecting device, the "Wheel Speed Detecting Device in Motorcycles" disclosed in Japanese Patent Laid-Open No. H8-133154 has been known. This background art will be explained in detail by referring to FIG. 18.

FIG. 18 is a side view of a background art wheel speed detecting device. The wheel speed detecting device mounted on the rear wheel of a motorcycle will be explained below.

In a wheel speed detecting device 150, a sensor ring (hereinafter referred to as the "pulsar ring") 153 is attached on a spoke portion 152 of a rear wheel 151. A pulse counting sensor 156 (e.g., an electromagnetic rotary sensor) is attached on a swing arm 155 which supports the rear wheel 151, oppositely to teeth 154 of the pulsar ring 153.

According to the wheel speed detecting device 150, with the rotation of the rear wheel 151, the pulsar ring 153 rotates together with the rear wheel 151, while the teeth 154 of the pulsar ring 153 pass the pulse counting sensor 156. The pulse counting sensor 156 counts the teeth 154 that have passed thereby, thus detecting the wheel speed of the rear wheel 151 (the rotational speed of the rear wheel 151).

To improve the detection accuracy of the teeth 154 by the pulse counting sensor 156, it is desirable to mount the pulse counting sensor 156 close to the teeth 154. In order to mount the pulse counting sensor 156 close to the teeth 154, it is necessary to set the flatness of the pulsar ring 153 (particularly, the teeth 154).

If the flatness of the pulsar ring 153 exceeds a permissible range, unevenness of the pulsar ring 153 increases. It is therefore necessary set the pulse counting sensor 156 apart from the teeth 154 with the unevenness taken into account. Accordingly, it is difficult to improve the detection accuracy of the teeth 154 by the pulse counting sensor 156.

The teeth 154 of the pulsar ring 153, therefore, have been formed by a cutting process to set the flatness of the pulsar ring 153 (especially the teeth 154 ) within the permissible range. This processing of the pulsar ring 153 requires time and labor, thus increasing the cost.

Forming the pulsar ring 153 by pressing has also been considered. However, since the teeth 154 are relatively long and slender, if processed by pressing, the teeth 154 of the pulsar ring 153 will be subjected to warpage.

Therefore, it is necessary to correct the warpage of the teeth 154 after pressing the pulsar ring 153. This also increases the time and labor, thus increasing cost.

It has therefore been desired to put into practice a wheel speed detecting device capable of enhancing the detecting accuracy and lowering cost.

SUMMARY OF THE INVENTION

It is therefore an object of the present invention to provide a device which can enhance the detecting accuracy of a wheel speed detecting device and lower the cost.

In view of the above-described problems, the wheel speed detecting device according to a first aspect of the present invention comprises a pulsar ring attached on the wheel side and a pulse counting sensor attached on the vehicle body side. The pulsar ring comprises a disc, and pulse detecting holes or pulse detecting recesses are provided at a predetermined pitch on a pitch circle drawn in a radially inward circumferential position spaced at a distance from an outer edge of the disc.

The pulse detecting holes are opened at a position on the center side, spaced from an outer edge of the pulsar ring, whereby the outer edge of the pulsar ring can remain in a circular shape. Therefore, it is possible to reduce warpage of the pulsar ring at the outer edge if the pulse detecting holes are formed by pressing. Furthermore, the flatness of the pulsar ring can be held within the permissible range.

According to a second aspect of the present invention, when the disc has a sensing surface on the side directed toward the pulse counting sensor, a stiffening rib is provided in the vicinity of, or on the back side of, the sensing surface.

The sensing surface can be increased in rigidity by providing the stiffening rib in the vicinity of, or on the back side of, the sensing surface. Therefore, if the pulsar ring has a reduced plate thickness, it is possible to ensure the flatness of the sensing surface within the permissible range, while enabling a reduction in weight of the pulsar.

A third aspect of the present invention is characterized in that the stiffening rib is provided along the sensing surface, and the height of this stiffening rib is set larger than the clearance from the sensing surface to the pulse counting sensor.

The stiffening rib is provided along the sensing surface and the height of this stiffening rib is increased larger than the clearance from the sensing surface to the pulse counting sensor. Therefore, it is possible to cover the clearance between the sensing surface and the pulse counting sensor with the stiffening rib, the stiffening rib being usable as a protective cover. Therefore, the clearance between the sensing surface and the pulse counting sensor is protected by the stiffening rib, so that the clearance can be prevented from catching a flying substance such as a flying rock.

Furthermore, since the stiffening rib is usable as a protective cover, no individual protective cover is needed, thereby preventing an increase in the number of components. Accordingly, the time and effort required to install a protective cover can be dispensed with.

In a fourth aspect of the present invention, the stiffening rib is formed by bending the outer edge of the disc.

With this construction, the wheel speed detecting device can be improved in quality by increasing the rigidity of the pulsar ring with the outer edge of the disc being bent.

Furthermore, a pulsar ring of predetermined thickness can be obtained with a decrease in weight, making it possible to decrease cost and to improve vehicle performance.

A fifth aspect of the present invention is characterized in that the pulsar ring is prepared from a pressed part with punched pulse detecting holes, and one or both sides of the pulsar ring which faces toward a punch is called the first side and the other is the second side. Furthermore, the pulsar ring is attached so that the second surface faces the pulse counting sensor.

When the pulse detecting hole is punched from the first side through to the second side, the edge of the hole in the first side becomes round, while the hole in the second side has a sharp edge.

In the fifth aspect of the present invention, the pulsar ring is attached with the second side having the sharp-edge holes directed toward the pulse counting sensor.

By using the pulsar ring having sharp-edge holes, the sensing performance of the pulse counting sensor can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein

FIGS. 13(a) and 13(b) are sectional views of the wheel speed detecting device (the sixth embodiment) of the invention mounted on the rear wheel;

DESCRIPTION OF THE PREFERRED EMBODIMENTS

Figure 1:
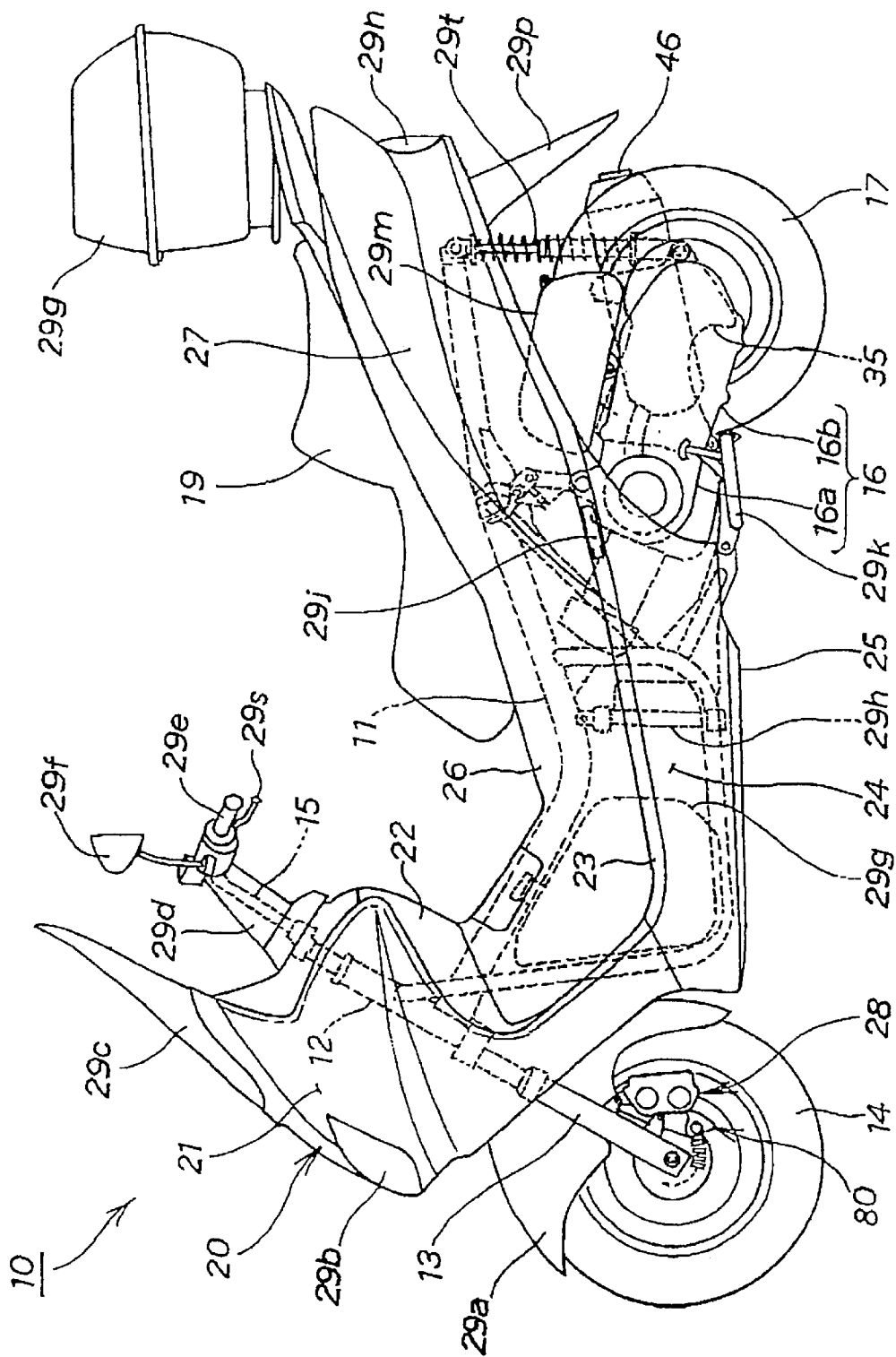
FIG. 1 is a left side view of a motorcycle of the present invention.

Preferred embodiments of the invention will now be explained with reference to the accompanying drawings. In the drawings, the "front," "rear," "left," "right," "upper" and "lower" designations refer to the orientation of the motorcycle in relation to the driver when sitting normally in the driver's seat. The drawings are to be viewed in the direction of reference numerals.

FIG. 1 is a left side view of a motorcycle of the present invention.

The motorcycle 10 is a scooter-type vehicle comprising such prime constituents as a vehicle frame 11, a front fork 13 attached to a head pipe 12 of the vehicle frame 11, a front wheel 14 attached on the front fork 13, a handlebar 15 connected to the front fork 13, a swing unit 16 (engine 16a and transmission 16b) attached on the rear upper part of the vehicle frame 11, a rear wheel 17 attached on the rear part of the swing unit 16, a seat 19 mounted on the rear upper part of the vehicle frame 11, and a body cover 20 covering the vehicle frame 11.

The body cover 20 comprises a front cover 21 covering the front part of the head pipe 12 and the upper part of the front wheel 14, an inner cover 22 covering the rear part of the front cover 21, right and left floor steps 23 (only the left floor step 23 is shown in FIG. 1) as low-floor type foot rests for the driver, right and left floor skirts 24 (only the left floor skirt 24 is shown in FIG. 1) extended downward from the outer edge of the floor step 23, an under cover 25 covering the lower edge of the floor skirt 24, a center cover 26 extended to the rear from the inner cover 22 to cover the central part in the longitudinal direction of the vehicle frame 11, and a side cover 27 extended to the rear from the center cover 26 to cover both sides of the rear part of the vehicle frame 11.

In the drawing, reference numeral 28 denotes a hydraulic front disc brake; 29a, a front fender; 29b, a headlight; 29c, a windshield; 29d, a handle cover; 29e, a handle grip; 29f, a mirror; 29g, a fuel tank; 29h, an engine cooling radiator; 29j, a foldable bar step for a rear seat passenger; 29k, a main stand; 29m, an air cleaner; 29n, a taillight; 29p, a rear fender; 29q, a storage box; 29s, a rear brake operating member; and 29t, a rear suspension.

Figure 2:
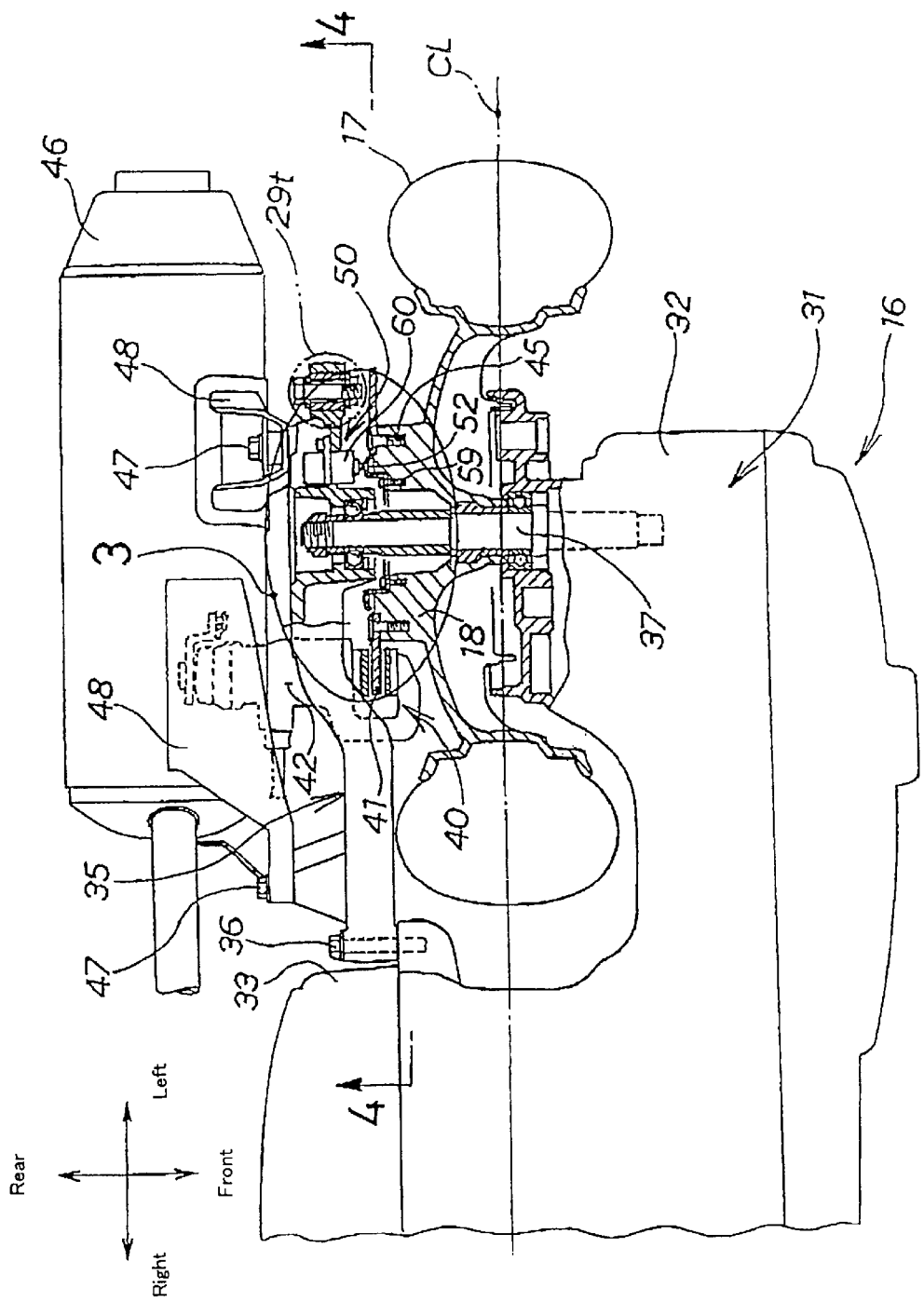
FIG. 2 is a plan view of a motorcycle with a wheel speed detecting device (the first embodiment) of the present invention mounted to the rear wheel.

FIG. 2 is a plan view of a motorcycle with the wheel speed detecting device (of the first embodiment) according to the present invention mounted on the rear wheel.

The left rear part of the swing unit 16, that is, the left rear part 32 of the transmission case 31, on the left side of the vehicle centerline (CL) (the center of vehicle width) extends to the rear along the vehicle CL. Therefore, the left rear part 32 of the transmission case 31 is extended further to the rear than the right rear end part 33.

In FIG. 2, the swing arm 35 is attached at the front part by a bolt 36 midway in the longitudinal direction of the swing unit 16, that is, at the right rear end part 33 of the transmission case 31; the swing arm 35 is extended to the rear, so that a rear axle 37 is rotatably supported by the left rear part 32 of the transmission case 31 and the rear part of the swing arm 35; and the rear wheel 17 is mounted to the rear axle 37. As a result, the rear wheel 17 can be supported between the rear part of the swing unit 16 and the rear part of the swing arm 35.

Reference numeral 46 denotes a muffler; 47, a bolt; and 48, a bracket.

At the rear part of the motorcycle 10 are mounted a rear brake 40 and a wheel speed detecting device 50 (for the rear wheel) of the present invention.

The rear brake 40 is a hydraulic rear disc brake comprising a disc-like brake disc 41 bolted to the right side of a hub 18 of the rear wheel 17, and a caliper 42 bolted to the swing arm 35 for brake control of the brake disc 41.

The wheel speed detecting device (for the rear wheel) 50 comprises a pulsar ring 52 bolted to the right side of the wheel side (the hub 18 of the rear wheel 17), and a pulse counting sensor 60 bolted to the vehicle body side (the swing arm 35).

The wheel speed detecting device (for the rear wheel) 50 of the present invention will now be described in detail.

Figure 3:
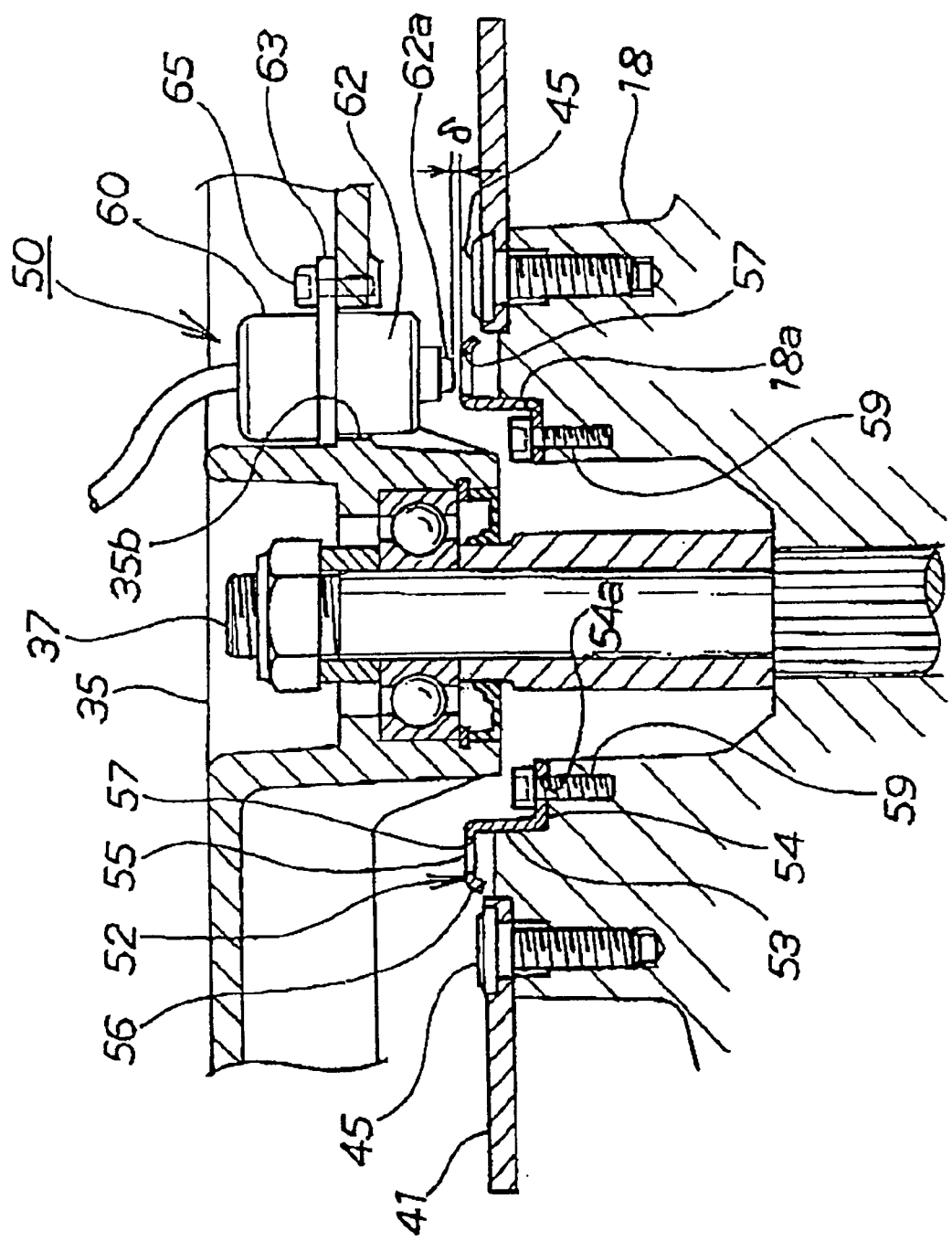
FIG. 3 is an enlarged view of the section 3 in FIG. 2.

FIG. 3 is an enlarged view of the section 3 in FIG. 2, that is, a sectional view of the wheel speed detecting device (for the rear wheel) of the present invention.

The wheel speed detecting device (for the rear wheel) 50 functions to count pulse detecting holes 57 made in the pulsar ring 52 by means of the pulse counting sensor 60, and to detect the rotational speed (wheel speed) of the rear wheel 17 (shown in FIG. 2).

The pulsar ring 52 is comprised of a cylindrical portion 53 which can be fitted in the recess portion 18a of the hub 18, a seat plate 54 formed on the bottom of the cylindrical portion 53, a disc 55 formed on the top of the cylindrical portion 53, pulse detecting holes 57 made at predetermined pitches near the center of a predetermined distance from the outer edge 56 of the disc 55 (see FIG. 4 also), and a bent portion (hereinafter referred to as the "bent portion 56") formed by bending the outer edge 56 of the disc 55.

The pulsar ring 52 has four bolt holes 54a made in the seat plate 54, and is installed in the recess portion 18a of the hub 18 by inserting the bolts 59 into the bolt holes 54a and tightening the bolts 59 into the hub 18.

The hub 18 is positioned properly at a predetermined position in the direction of vehicle width in order to position the rear wheel at a predetermined position in the direction of the wheel width. Furthermore, the pulsar ring 52 can readily be located in a desired position in the direction of the vehicle width by mounting the pulsar ring 52 in the recess portion 18a of the hub 18. Therefore, the pulsar ring can be installed in a short time.

The pulse counting sensor 60 is an electromagnetic rotary sensor, including a body 62 inserted into a mounting hole 35b of the swing arm 35, and an overhanging plate 63 extended unitarily from the body 62 and pressed against the swing arm 35 by the bolts 65, 65.

The detecting portion 62a of the pulse counting sensor 60 can be mounted at a predetermined spacing correspondingly to the pulse detecting holes 57 of the pulsar ring 52 by attaching the pulse counting sensor 60 to the swing arm 35.

The predetermined spacing can be made smaller by using the electromagnetic rotary sensor as the pulse counting sensor 60, thereby improving the detecting accuracy. Therefore, it is necessary to set the flatness of the pulsar ring 52 within the permissible range.

The flatness of the pulsar ring 52 will be explained below in detail with reference to FIG. 7.

Figure 4:
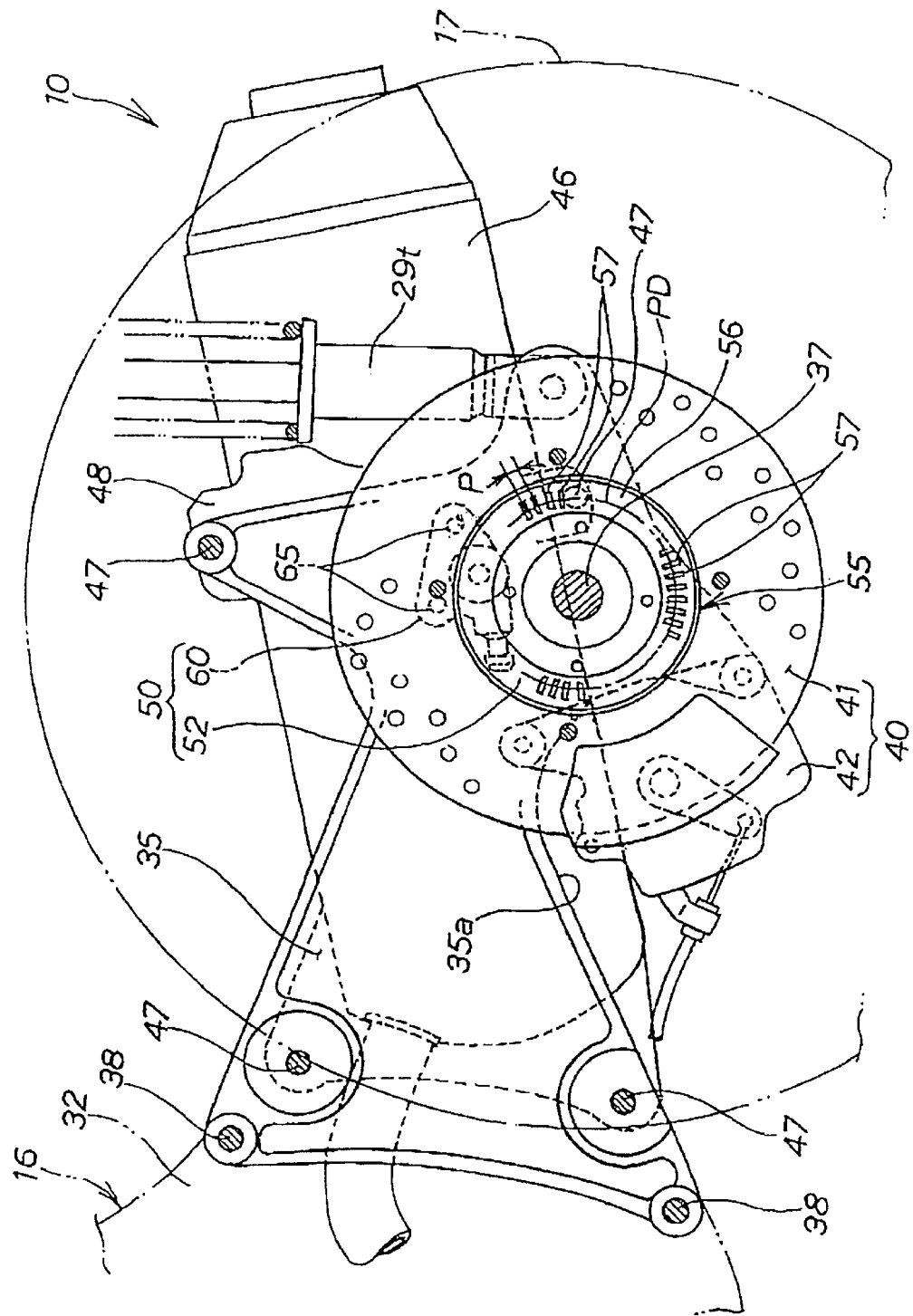
FIG. 4 is a sectional view taken along line 4—4 of FIG. 2.

FIG. 4 is a sectional view taken along line 4—4 of FIG. 2. In this drawing, the swing arm 35 (an approximately triangular plate tapering toward the rear as viewed from the side) is attached at the base portion by two upper and lower bolts 38, 38 to the swing unit 16.

A recess portion 35a, which is curved upward, is formed on the lower slanting portion. In this recess portion 35a, the caliper 42 is mounted. A the rear end of the swing arm 35, the pulse counting sensor 60 is attached by bolts 65, 65.

Furthermore, the pitch circle PD is drawn near the center of a predetermined distance from the outer edge 56 of the disc 55 of the pulsar ring 52. On the pitch circle PD the pulse detecting holes 57 are made at a predetermined pitch P. The pulse detecting hole 57 is a slit (a narrow clearance).

Figure 5:
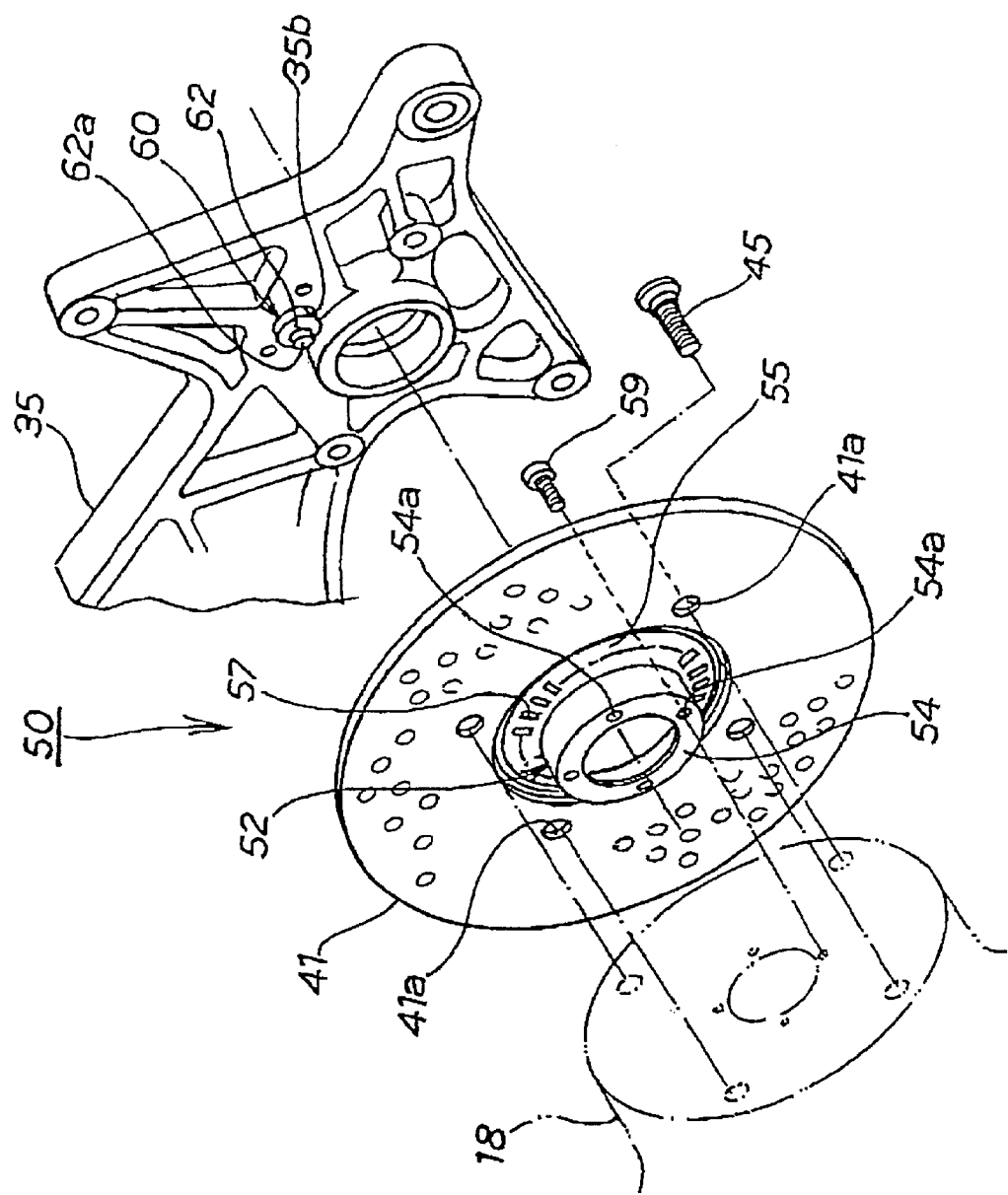
FIG. 5 is an exploded perspective view of the wheel speed detecting device (the first embodiment) for the rear wheel of the present invention.

FIG. 5 is an exploded perspective view of the wheel speed detecting device (for the rear wheel) (the first embodiment) according to the present invention. In this drawing, the bolts 59 are inserted into the bolt holes 54a of the seat plate 54 of the pulsar ring 52, to thereby attach the pulsar ring 52 to the hub 18. Outside of the pulsar ring 52 is mounted the brake disk 41. Then the bolts 45 are inserted into the bolt holes 41a of the brake disk 41, to attach the brake disc 41 to the hub 18. In this state, the body 62 of the pulse counting sensor 60 protrudes out of the hole 35b of the swing arm 35.

Inside of the brake disc 41 is mounted the pulsar ring 52. The pulse counting sensor 60 is placed in the vicinity of the side of the pulsar ring 52. It is, therefore, possible to layout the wheel speed detecting device (for the rear wheel) 50 with a compact design.

Next, the method of fabricating the pulsar ring of the wheel speed detecting device (for the rear wheel) described above will be explained.

Figures 6A, 6B:
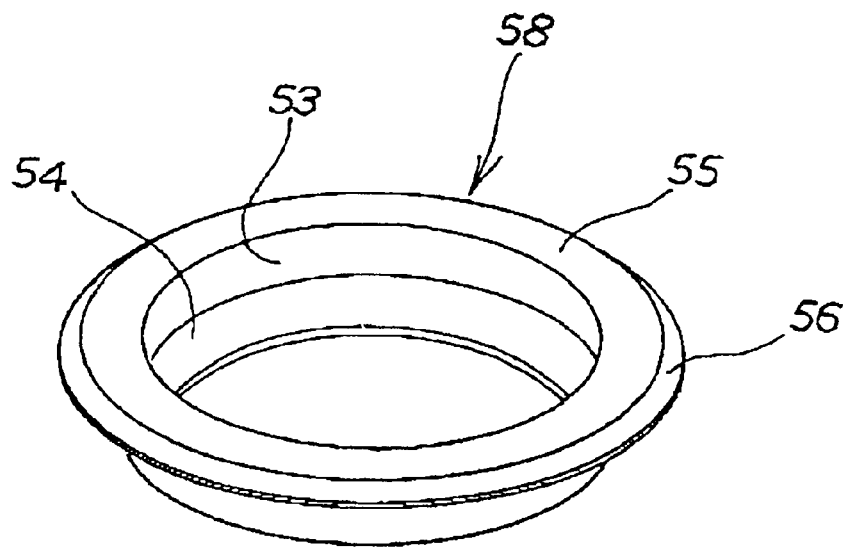
FIGS. 6(a) and 6(b) are views explaining a method of fabricating a pulsar ring of the wheel speed detecting device (the first embodiment) for the rear wheel of the present invention.

FIGS. 6(a) and (b) are drawings explaining the method of fabricating the pulsar ring of the wheel speed detecting device (for the rear wheel) of the first embodiment according to the present invention.

In FIG. 6(a), a blank is pressed into a shaped body 58 unitarily including the cylindrical portion 53, seat plate 54, disc 55, and bent portion 56.

The pulsar ring can be enhanced in rigidity by forming the bent portion 56 (see FIG. 4 also) on the outer edge of the disc 55. Therefore, it is possible to decrease the plate thickness of the pulsar ring.

In FIG. 6(b), the shaped body 58 is pressed to form a plurality of pulse detecting holes 57 in the disc 55, and four bolt holes 54a (only two holes are shown) in the seat plate 54, thus completing the fabricating process of the pulsar ring 52.

Since the portion to be detected of the pulsar ring 52 has been changed from a conventional tooth to the pulse detecting holes 57, the outer edge (i.e., the bent portion) of the pulsar ring 52 can be left in a circular shape. Therefore, the disc 55 of the pulsar ring 52 can be prevented from warping at the outer edge 56 if the pulse detecting holes 57 are made by pressing the disc 55, thereby enabling the flatness of the disc 55 to remain within a permissible range.

Figure 7A:
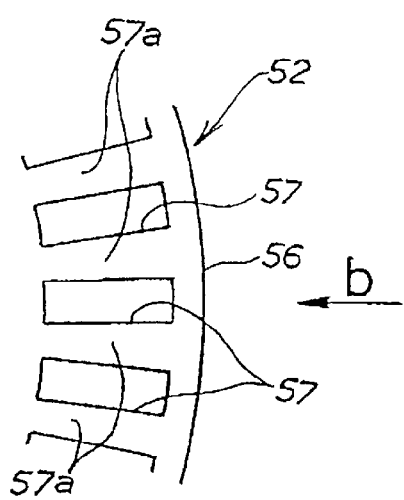
FIGS. 7(a), 7(b), 7(c) and 7(d) are views illustrating the pulsar ring of the wheel speed detecting device (the first embodiment) for the rear wheel of the present invention.
Figure 7B:
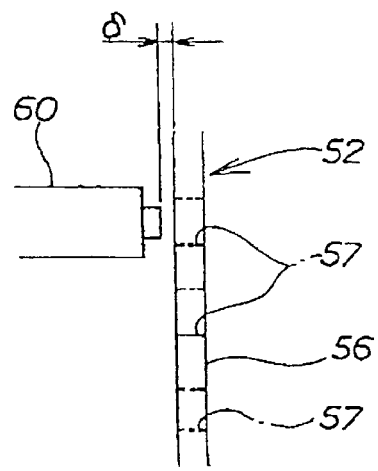
Figure 18:
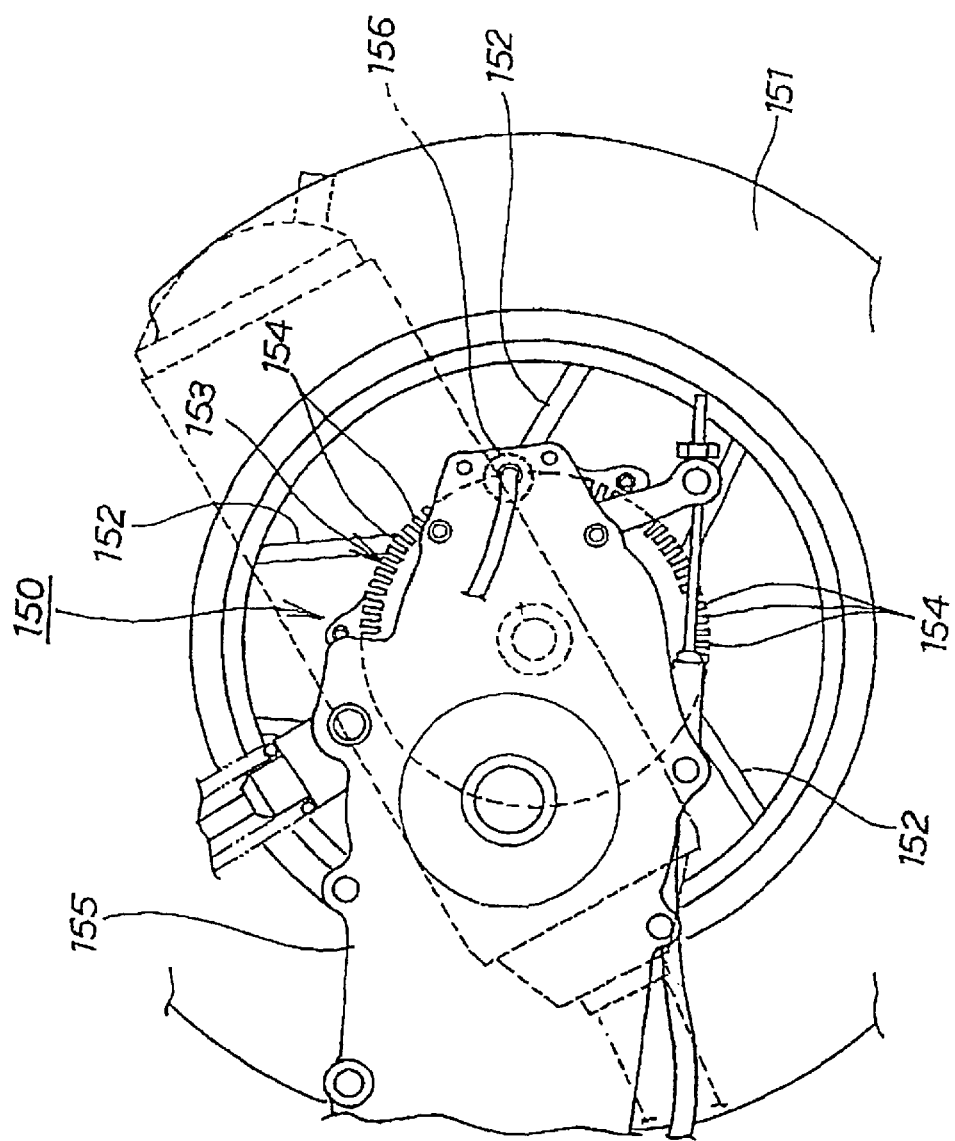
FIG. 18 is a side view of a wheel speed detecting device according to the background art.

FIGS. 7(a) and (b) are drawings explaining the pulsar ring of the wheel speed detecting device (for the rear wheel) (the first embodiment) according to the present invention. FIGS. 7(a) to 7(b) illustrate the embodiment of the pulsar ring 52 shaped by pressing, and FIGS. 7(c) to 7(d) show an example for comparison of the background art pulsar ring 153 (see FIG. 18).

Figure 7C:
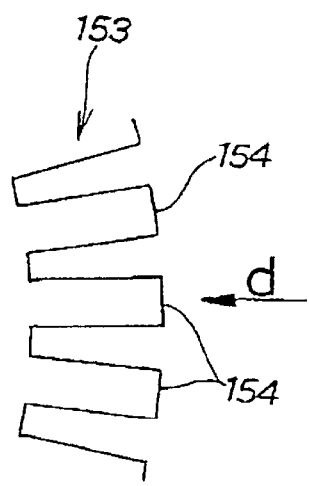
Figure 7D:
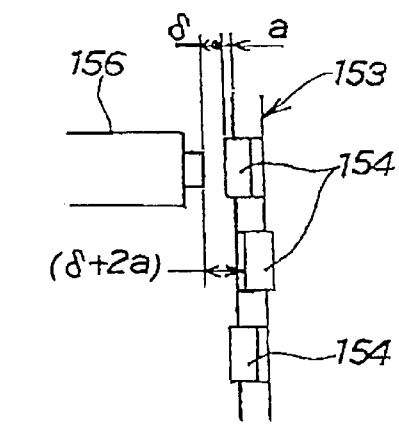

FIG. 7(b) is a view seen from the arrow b in FIG. 7(a), and FIG. 7(d) is a view seen from the arrow d in FIG. 7(c).

FIG. 7(a) shows the pulsar ring 52 with a plurality of pulse detecting holes 57 formed by pressing along the outer edge 56. It is possible to connect the pulse detecting holes 57 at the forward end of the wall portions 57a by the outer edge 57, that is, to form the outer edge of the pulsar ring 52 in a circular shape.

FIG. 7(b) shows the outer edge of the pulsar ring 52 having no warpage even after pressing the pulse detecting holes 57. Therefore, it is possible to keep the flatness of the pulsar ring 52 within the permissible range.

The distance δ between the pulse counting sensor 60 and the pulsar ring 52 can be set in a desired position.

FIG. 7(c) shows the pulsar ring 153 with a plurality of teeth 154 formed by pressing along the outer edge thereof. In this state, the plurality of teeth 154 protruding along the outer edge of the pulsar ring 153.

FIG. 7(d) shows the pulsar ring 153 with the teeth 154 warped at the time of pressing the teeth 154. The flatness of the pulsar ring 153, therefore, can not be kept within the permissible range. Accordingly, the clearance between the pulse counting sensor 156 and the pulsar ring 153 increases to (δ+2×a), making it difficult to improve the detecting accuracy.

It is therefore necessary to set the flatness of the pulsar ring 153 within the permissible range by correcting the warpage a of the teeth 154 after pressing the pulsar ring 153.

Next, the wheel speed detecting device 80 for the front wheel will be explained. It should be noted that the same members as those in the wheel speed detecting device 50 for the rear wheel are designated by the same reference numerals and will not be described.

Figure 8:
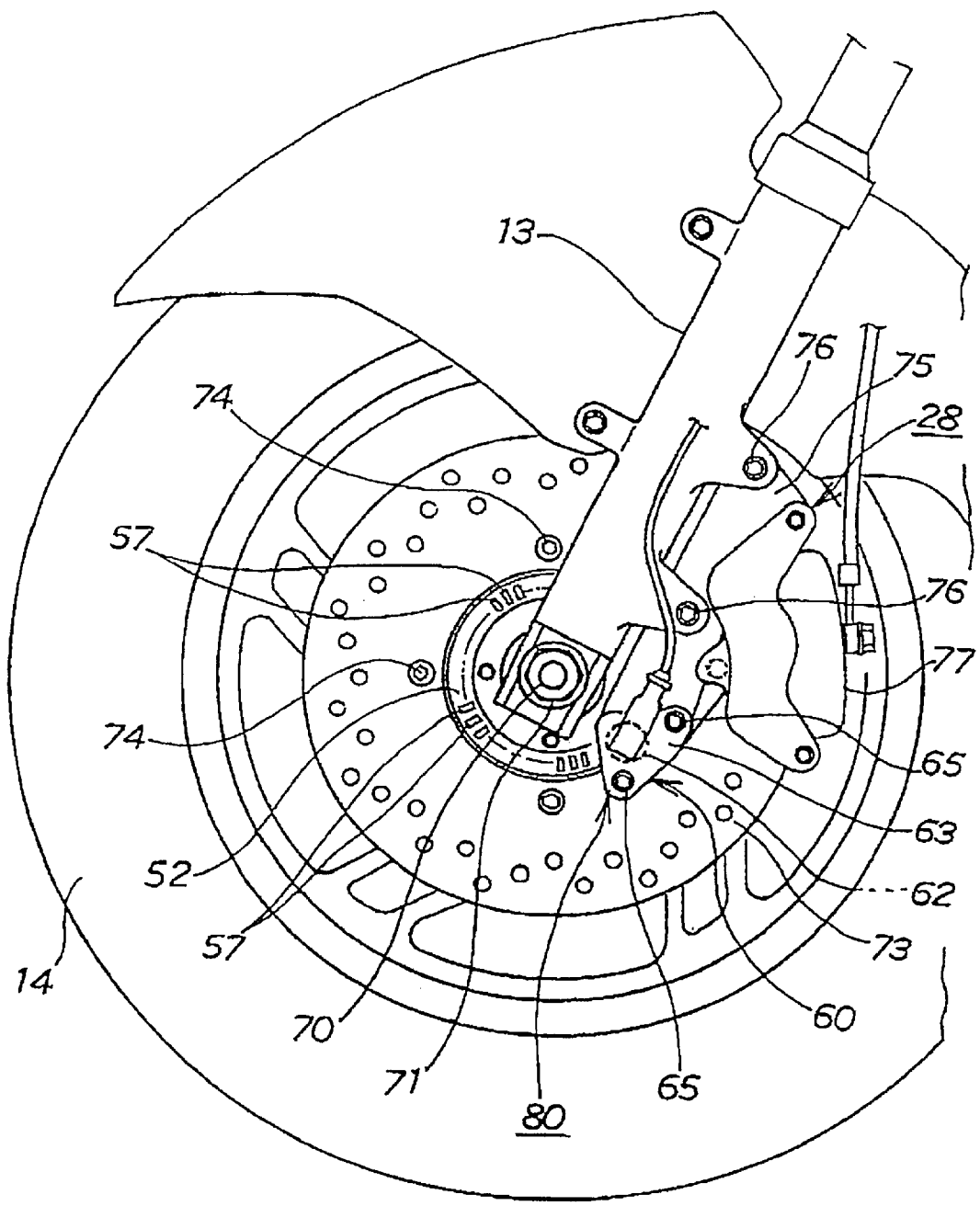
FIG. 8 is a side view of the wheel speed detecting device (the second embodiment) for the front wheel of the present invention.

FIG. 8 is a side view of the wheel speed detecting device for the front wheel (the second embodiment) according to the present invention. In this drawing, a front axle 70 is attached by a nut 71 to the front fork 13; the front wheel 14 is rotatably attached to the front fork 13; a brake disc 73 of the hydraulic front disc brake 28 is attached by bolts 74 to the front wheel hub (not shown); a bracket 5 is attached by bolts 76, 76 to the front fork 13; and a brake caliper 77 is attached to the bracket 75, thus being located on the outer peripheral side of the brake disc 73.

The wheel speed detecting device 80 for the front wheel, like the wheel speed detecting device 50 for the rear wheel, is comprised of the pulsar ring 52 attached on the front wheel 14 side (an unillustrated front wheel hub), and the pulse counting sensor 60 attached on the vehicle body side (the bracket 75).

The wheel speed detecting device 80 for the front wheel functions to detect the rotational speed (the wheel speed) of the front wheel 14 by counting the pulse detecting holes 57 in the pulsar ring 52 by means of the pulse counting sensor 60.

The pulsar ring 52 is located inside of the brake disk 73, and in the vicinity of the side thereof is placed the pulse counting sensor 60. Therefore, it is possible to realize the compact layout of the wheel speed detecting device 80 for the front wheel.

The pulse counting sensor 60 for the front wheel, like the pulse counting sensor 60 for the rear wheel, is an electromagnetic rotary sensor in which the body 62 is inserted into the mounting hole in the bracket 75 and then the overhanging plate 63 is attached by bolts 65, 65 to the bracket 75.

Also like in the wheel speed detecting device 50 for the rear wheel, attaching the pulse counting sensor 60 to the bracket 75 makes it possible to position the detecting portion of the pulse counting sensor 60 for the front wheel oppositely to the pulse detecting holes 57 of the pulsar ring 52.

Next, the third to seventh embodiments will be explained.

The same members as those in the first embodiment are designated by the same reference numerals and will not be described.

Figure 9:
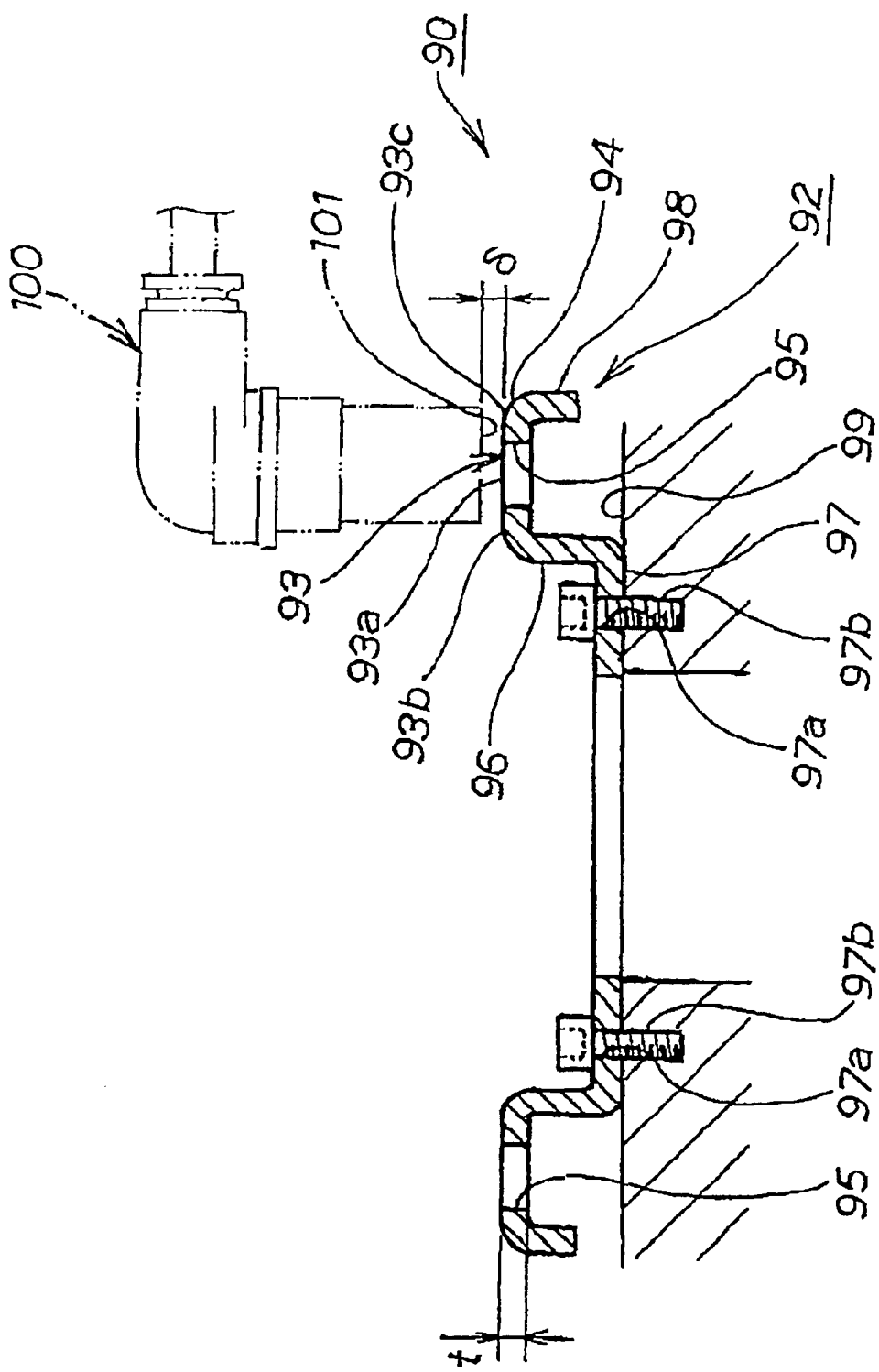
FIG. 9 is a sectional view of the wheel speed detecting device (the third embodiment) of the present invention mounted on the rear wheel.

FIG. 9 is a sectional view of the wheel speed detecting device (the third embodiment) of the invention mounted to the rear wheel.

A wheel speed detecting device 90 for the rear wheel is comprised of a pulsar ring 92 mounted on the wheel side and a pulse counting sensor 100 mounted on the vehicle body side.

The pulsar ring 92 includes a disc 93 with a sensing surface 93a directed toward the pulse counting sensor 100, pulse detecting holes 95 formed in the disc at predetermined pitches near the center of a predetermined distance from the outer edge 94 of the disc 93, a stiffening rib (inner rib) 96 formed along the vicinity of the inner periphery 93b of the disc 93, a seat plate 97 formed on the bottom of the inner rib 96, and a stiffening rib (outer rib) 98 formed along the vicinity of the outer region 93c of the disc 93.

The inner rib 96 is an annular portion formed by bending along the vicinity of the sensing surface 93a, that is, along the vicinity of the inner periphery 93b of the sensing surface 93a. The outer rib 98 is an annular portion formed by bending along the vicinity of the sensing surface 93a, that is, along the vicinity of the outer region 93c of the sensing surface 93a.

The pulsar ring 92, like the pulsar ring 52 of the first embodiment, is provided with four bolt holes 97a (only two holes are shown) in the seat plate 97. Bolts 97b are inserted into the bolt holes 97a and tightened into the hub 99, thereby installing the pulsar ring 92 to the hub 99.

The hub 99 is properly positioned at a predetermined position in the direction of vehicle width in order to position the rear wheel 17 (shown in FIG. 2) at a predetermined position in the direction of the wheel width. Therefore, it is possible to place the pulsar ring 92 at a desired position in the direction of vehicle width by mounting the pulsar ring 92 on the hub 99.

The pulse counting sensor 100, like the pulse counting sensor 60 of the first embodiment, is an electromagnetic rotary sensor attached on an unillustrated swing arm, and has a like function as the pulse counting sensor 60.

According to the pulsar ring 92, the inner and outer ribs 96 and 98 are formed in the vicinity of the sensing surface 93a, that is, along the inner periphery 93b and the outer region 93c of the sensing surface 93a respectively, thereby enabling an increase in the rigidity of the disc 93 having the sensing surface 93a.

Therefore, the flatness of the sensing surface 93a can be kept within the permissible range even if the plate thickness t of the pulsar ring 92 is set at a small value. Therefore, it is possible to keep a highly accurate distance δ between the sensing surface 93a and the detecting surface 101 of the pulse counting sensor 100. Therefore, the weight of the pulsar ring 92 can be reduced, thereby decreasing cost and enhancing vehicle performance.

Furthermore, since the flatness of the pulsar ring 92 is kept within the permissible range, the detection accuracy of the wheel speed detecting device 90 can be improved.

Figure 10A:
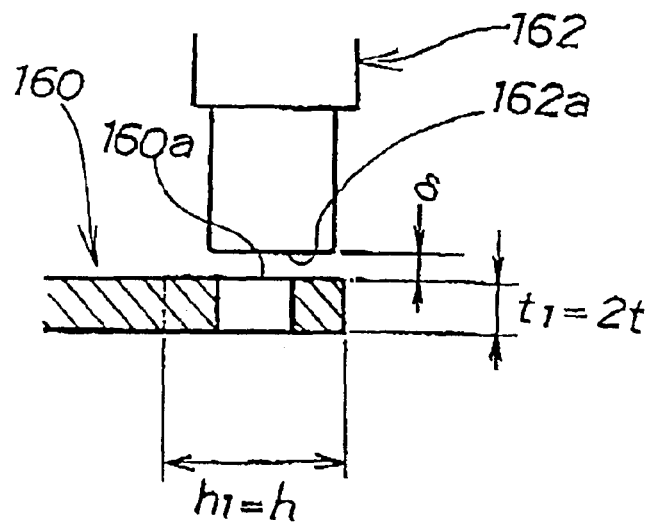
FIGS. 10(a) and 10(b) are explanatory views illustrating the rigidity of the wheel speed detecting device (the third embodiment) of the present invention.
Figure 10B:
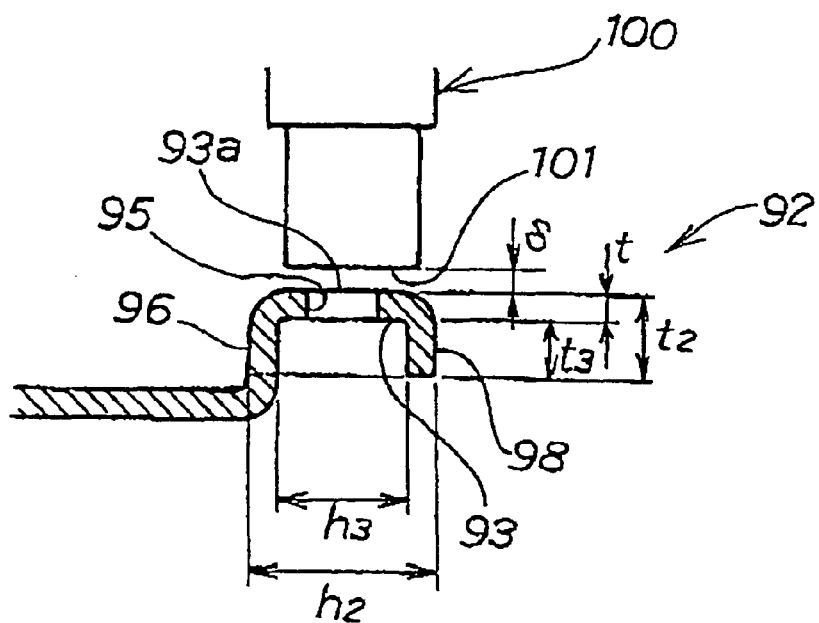

FIGS. 10(a) and 10(b) are explanatory views of the rigidity of the wheel speed detecting device (the third embodiment) according to the present invention. FIG. 10(a) shows a pulsar ring 160 as an example for comparison and FIG. 10(b) shows the pulsar ring 92 as an example of the present invention, explaining the setting of the plate thickness t of the pulsar ring 92 at one-sixth of the plate thickness $t_1$ of the pulsar ring 160.

In FIG. 10(a), setting a great plate thickness $t_1$ of the pulsar ring 160 increases the rigidity of the pulsar ring 160 and also improves the accuracy of the predetermined clearance from the detecting surface 162 of the pulse counting sensor 162a to the sensing surface 160a of the pulsar ring 160.

Assuming that the plate thickness of the pulsar ring 160 is $t_1$ and the width of the sensing surface 160a is $h_1$, the modulus of section $Z_1$, is given by $$Z_1 = h_1 \times (t_1)^2/6 \qquad (1)$$

Here, presume $t_1=6$ mm and $h_1=h$, and the following equation is given by Equation (1).

$$Z_1 = h \times (6)^2/6 = 6h \qquad (2)$$

In FIG. 10(b), suppose that t is the plate thickness of the pulsar ring 92, $h_2$ is the width of the sensing surface 93a, $t_2$ is a distance from the sensing surface 93a to the end of the outer rib 98 (the length of the outer rib 98), $t_3$ is a distance from the inner surface of the disc 93 to the end of the outer rib 98, and $h_3$ is a distance from the inside surface of the inner rib 96 to the inside surface of the outer rib 98, the modulus of section $Z_2$ is given by the following equation.

$$Z_2 = l_2/(t_2/2) \qquad (3)$$

Where $l_2$ is a geometrical moment of inertia, and is expressed by $$l_2 = \{h_2 \times (t_2)^3/12 - h_3 \times (t_3)^3/12\} \qquad (4)$$

Substituting Equation (4) in Equation (3) gives $$Z_2 = h_2 \times (t_2)^2/6 - h_3 \times (t_3)^3/(6 \times t_2) \qquad (5)$$

Here, suppose that t=1 mm, $t_2$=10 mm, $h_2$=h, $t_3$=9 mm, and $h_3$=h−2×1, and from Equation (5) is obtained the following equation.

$$Z_2 = h \times (10)^2/6 - (h-2) \times (9)^3/(6 \times 10) \qquad (6)$$

Here, suppose that h=16 mm, and the relationship $Z_2=Z_1$ is obtainable from Equation (2)

$$Z_1 = 6 \times 16 = 96$$

and from Equation (6)

$$Z_2 = 16 \times (10)^2/6 - (16-2) \times (9)^3/(6 \times 10) = 95.8$$

It is understood from the above explanation that since the inner and outer ribs 96 and 98 are provided, the modulus of section $Z_2$ of the pulsar ring 92 can be kept equal to the modulus of section $Z_1$ of the pulsar ring 160 of FIG. 10(a) if the plate thickness t of the pulsar ring 92 of FIG. 10(b) is reduced to one-sixth of the plate thickness $t_1$ of the pulsar ring 160 of FIG. 10(a).

Therefore the pulsar ring 92 of FIG. 10(b), like the pulsar ring 160 of FIG. 10(a), also can be set accurately at the predetermined distance δ from the detecting surface 101 of the pulse counting sensor 100 to the sensing surface 93a.

The plate thickness t of the pulsar ring 92 and the length of the inner and outer ribs 96 and 98 may be set to optional values.

It is to be noticed that, in the third embodiment, an example provided with the inner and outer ribs 96 and 98 adopted as stiffening ribs has been explained, and the same effect is obtained if either one of the inner and outer ribs 96 and 98 is adopted.

Figures 11A, 11B:
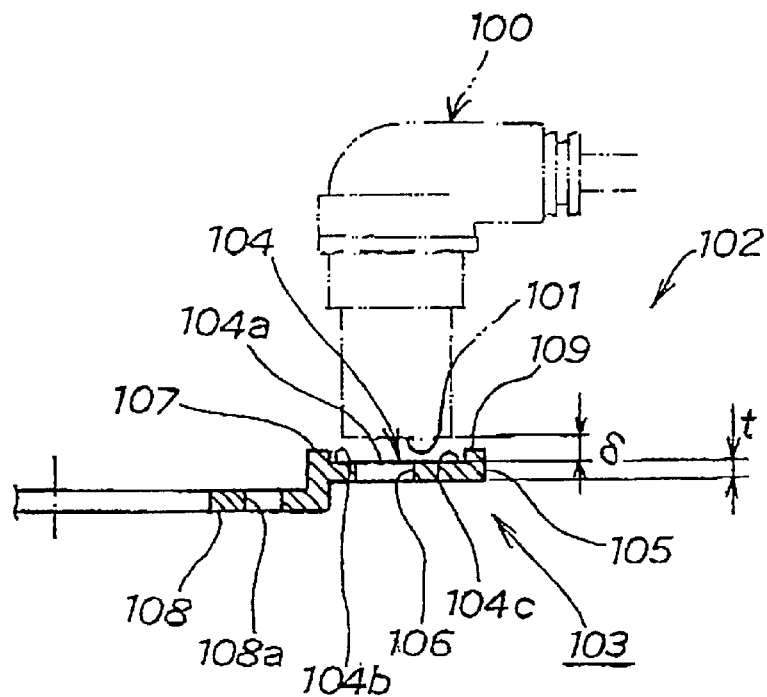
FIGS. 11(a) and 11(b) are sectional views of the wheel speed detecting device (the fourth embodiment) of the present invention mounted on the rear wheel.

FIGS. 11(a) and 11(b) are sectional views of the wheel speed detecting device (the fourth embodiment) according to the present invention mounted on the rear wheel.

The wheel speed detecting device 102 for the rear wheel includes a pulsar ring 103 mounted on the wheel side and the pulse counting sensor 100 mounted on the vehicle body side.

The pulsar ring 103 is comprised of a disc 104, the sensing surface 104a of which is directed toward the pulse counting sensor 100, pulse detecting holes 106 formed at a predetermined pitch near the center of a predetermined distance from the outer edge 105 of the disc 104, a stiffening rib (inner rib) 107 formed along the vicinity of the inner periphery 104b of the disc 104, a seat plate 108 formed at the bottom of the inner rib 107, and a stiffening rib (outer rib) 109 formed along the vicinity of the outer periphery 104c of the disc 104.

The inner rib 107 is an annular portion formed along the vicinity of the sensing surface 104a, that is, along the vicinity of the inner periphery 104b of the sensing surface 104a. The outer rib 109 is an annular portion formed along the vicinity of the sensing surface 104a, that is, along the vicinity of the outer periphery 104c of the sensing surface 104a.

Reference numeral 108a denotes a bolt hole, which is a hole for bolting the pulsar ring 103 to the hub.

In the pulsar ring 103, the inner and outer ribs 107 and 109 are formed in the vicinity of the sensing surface 104a, that is, along the inner periphery 104b and outer periphery 104c of the sensing surface 104a. Therefore, like the third embodiment, the disc 104 constituting the sensing surface 104a can be increased in rigidity.

Therefore, if the plate thickness t of the pulsar ring 103 is set small, the flatness of the sensing surface 104a can be kept within the permissible range. Therefore, it is possible to accurately keep the distance δ between the sensing surface 104a and the detecting surface 101 of the pulse counting sensor 100. Therefore, it is possible to reduce the weight of the pulsar ring 103.

Furthermore, since the flatness of the pulsar ring 103 can be kept within the permissible range, the detecting accuracy of the wheel speed detecting device 102 can be enhanced.

In the fourth embodiment, the provision of the inner and outer ribs 96 and 98 as the stiffening ribs has been explained. It should be noticed that the same effect can be obtained even when only one of the inner and outer ribs 96 and 98 is formed.

Figure 12A:
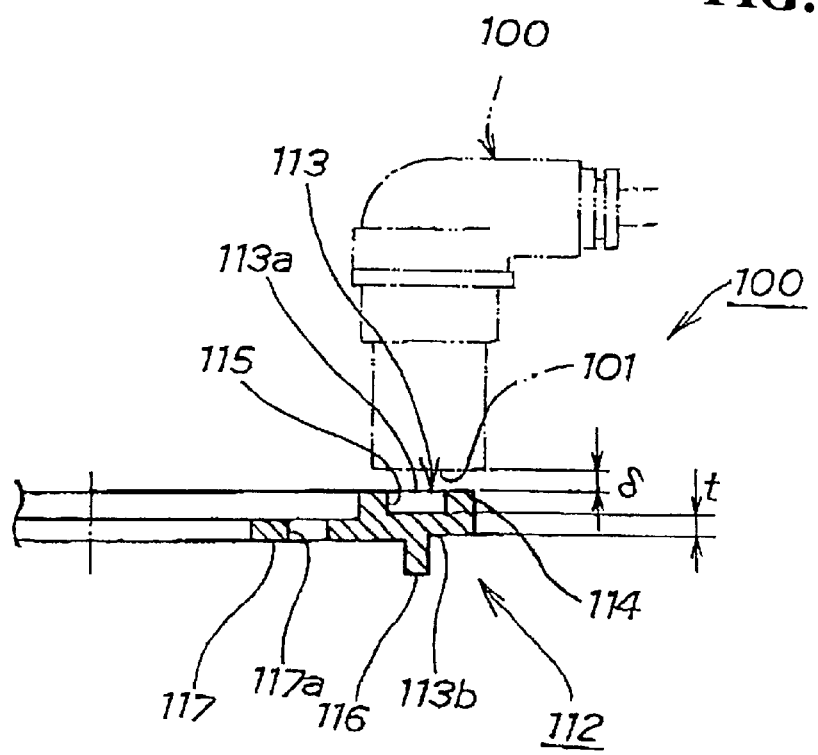
FIGS. 12(a) and 12(b) are sectional views of the wheel speed detecting device (the fifth embodiment) of the present invention mounted on the rear wheel.
Figure 12B:
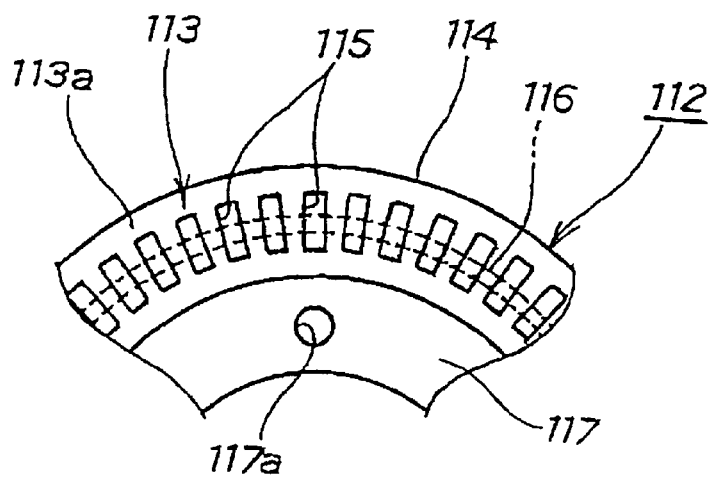

FIGS. 12(a) and 12(b) are sectional views of the wheel speed detecting device (the fifth embodiment) according to the present invention mounted on the rear wheel.

The wheel speed detecting device 110 for the rear wheel includes a pulsar ring 112 mounted on the wheel side and the pulse counting sensor 100 mounted on the vehicle body side.

The pulsar ring 112 comprises a disc 113 with its sensing surface 113a directed toward the pulse counting sensor 100, pulse detecting recesses 115 formed at a predetermined pitch near the center of a predetermined distance from the outer edge 114 of the disc 113, a stiffening rib 116 formed on the back side 113b (i.e., the back side of the sensing surface 113a) of the disc 113, and a seat plate 117 formed in the inside of the disc 113.

The stiffening rib 116 is an annular body formed on the back side 113b of the sensing surface 113a.

Reference numeral 117a denotes a bolt hole, through which the pulsar ring 112 is attached by a bolt to the hub.

In the pulsar ring 112, since the stiffening rib 116 is formed on the back side 113b of the sensing surface 113a, it is possible to increase the rigidity of the disc 113 which constitutes the sensing surface 113a.

Therefore, if the plate thickness t of the pulsar ring 112 is set small, the flatness of the sensing surface 113a can be held within the permissible range, thus enabling to keep an accurate distance δ between the sensing surface 113a and the detecting surface 101 of the pulse counting sensor 100. Therefore, it is possible to decrease the weight of the pulsar ring 112 and to lower the cost.

Furthermore, since the flatness of the pulsar ring 112 can be held within the permissible range, the detecting accuracy of the wheel speed detecting device 110 can be enhanced.

FIGS. 13(a) and 13(b) are sectional views of the wheel speed detecting device (the sixth embodiment) of the present invention mounted on the rear wheel.

The wheel speed detecting device 120 for the rear wheel comprises a pulsar ring 122 mounted on the wheel side and the pulse counting sensor 100 mounted on the vehicle body side.

The pulsar ring 122 comprises a disc 123 with its sensing surface 123a directed toward the pulse counting sensor 100, pulse detecting holes 125 opened at a predetermined pitch near the center of a predetermined distance from the outer edge 124 of the disc 123, a stiffening rib (the inner rib) 126 formed along the vicinity of the inner periphery 123b of the disc 123, a seat plate 127 formed on the bottom of the inner rib 126 and inside of the disc 123, and a stiffening rib (the outer rib) 128 formed along the vicinity of the outer periphery 123c of the disc 123.

The inner rib 126 is an annular body formed along the inner periphery 123b of the sensing surface 123a, with its height L1 being set greater than the distance δ from the sensing surface 123a to the detecting surface 101 of the pulse counting sensor 100.

The outer rib 128 is an annular body formed along the outer periphery 123c of the sensing surface 123a, with its height L1 being set greater than the distance δ from the sensing surface 123a to the detecting surface 101 of the pulse counting sensor 100.

Therefore, the clearance between the sensing surface 123a and the pulse counting sensor 100 (i.e., a clearance corresponding to the distance δ) can be covered with the inner and outer ribs 126 and 128. Therefore, it is possible to keep the clearance between the sensing surface 123a and the pulse counting sensor 100 by the inner and outer ribs 126 and 128, thereby preventing entry of a flying substance such as a flying rock into the clearance.

Reference numeral 127a denotes a bolt hole, which is used to bolt the pulsar ring 122 to the hub.

According to the sixth embodiment, the pulsar ring 122 is provided with inner and outer ribs 126 and 128 formed in the vicinity of the sensing surface 123a, that is, along the inner periphery 123b and outer periphery 123c of the sensing surface 123a, whereby the disc 123 having the sensing surface 123 a can be enhanced in rigidity.

Therefore, if the plate thickness t of the pulsar ring 122 is set small, the flatness of the sensing surface 123a can be held within the permissible range. It is therefore possible to accurately keep the distance δ between the sensing surface 123a and the detecting surface 101 of the pulse counting sensor 100, and accordingly to decrease the weight of the pulsar ring 122 and lower the cost.

Furthermore, since the flatness of the pulsar ring 122 can be kept within the permissible range, the detecting accuracy of the wheel speed detecting device 120 can be improved.

Furthermore, according to the sixth embodiment, the inner and outer ribs 126 and 128 are provided along the sensing surface 123a, and the height L1 of the inner and outer ribs 126 and 128 is set greater than the distance δ from the sensing surface 123a to the pulse counting sensor 100. Therefore, the clearance (i.e., the clearance corresponding to the distance δ) between the sensing surface 123a and the pulse counting sensor 100 can be covered with the inner and outer ribs 126 and 128. That is, the inner and outer ribs 126 and 128 are usable as protective covers.

Therefore, since the clearance between the sensing surface 123a and the pulse counting sensor 100 is covered by the inner and outer ribs 126 and 128, a flying substance like a flying rock can be prevented from entering the clearance. As a result, the detecting accuracy of the wheel speed detecting device 120 can be further improved.

Furthermore, because the inner and outer ribs 126 and 128 are able to serve also as protective covers, it is unnecessary to provide a separate protective cover, thereby enabling the prevention of an increase in the number of components, and furthermore to dispense with installation of a protective cover, and consequently to lower the cost.

According to the sixth embodiment, the inner and outer ribs 126 and 128 as the stiffening ribs have been explained. A similar effect is obtainable also when only one of the inner ribs 126 or outer ribs 128 is provided.

Figure 14:
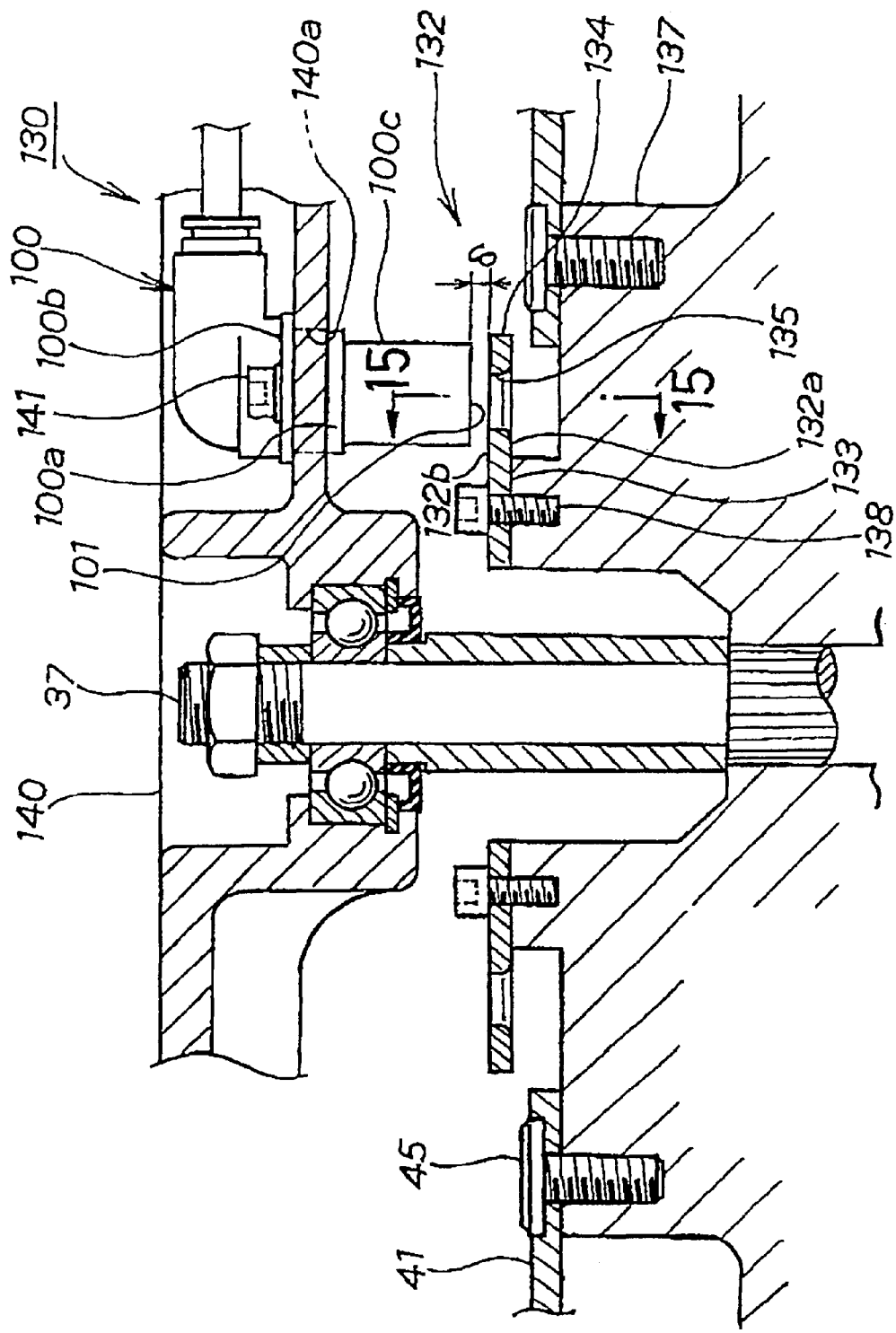
FIG. 14 a sectional view of the wheel speed detecting device (the seventh embodiment) of the present invention mounted on the rear wheel.

FIG. 14 is a sectional view of the wheel speed detecting device (the seventh embodiment) of the present invention mounted on the rear wheel.

In the wheel speed detecting device 130 for the rear wheel, the pulse detecting holes 135 made in the pulsar ring 132 are counted by means of the pulse counting sensor 100, to thereby detect the rotational speed (the wheel speed) of the rear wheel 17 (shown in FIG. 2).

The pulsar ring 132 is comprised of a disc 133 mounted by a bolt 138 to the hub 137, and a pulse detecting hole 135 formed at a predetermined pitch on a pitch circle drawn near the center of a predetermined distance from the outer edge 134 of the disc 133.

The pulsar ring 132 is produced of a pressed part with the pulse detecting hole 135 punched by a punch 139 (shown in FIG. 16). Of both sides of the pulsar ring 132, the side directed to the punch 139 is the first surface 132a, and the other side is the second surface 132b. The pulsar ring 132 is attached to the hub 137 with the second surface 132b directed toward the pulse counting sensor 100.

The hub 137 is properly positioned in a predetermined position in the direction of vehicle width for the purpose of positioning the rear wheel in the predetermined position in the direction of the wheel width. Therefore, it is possible to mount the pulsar ring 132 in a desired position on the hub 137 in the direction of vehicle width.

The pulse counting sensor 100 is an electromagnetic rotary sensor of such a configuration that the body 100a is inserted in a mounting hole 140a of a swing arm 140; and the mounting overhanging plate 100b extended unitarily from the body 100a is pressed against the swing arm 140; the overhanging plate 100b being attached by a bolt 141 to the swing arm 140b.

The detecting surface 101 of the detecting portion 100c is directed toward the second surface 132b of the pulsar ring 132 by attaching the pulse counting sensor 100 to the swing arm 140, and the clearance between the detecting surface 101 and the second surface 132b is set to the predetermined clearance.

Figure 15:
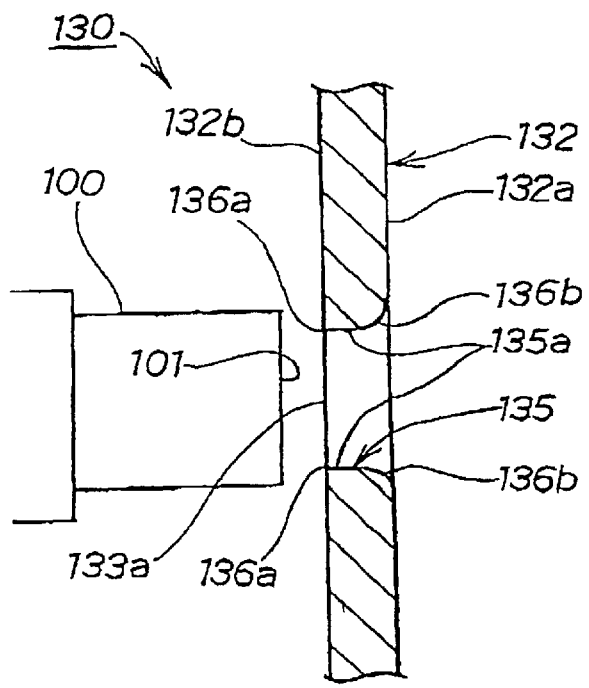
FIG. 15 is a sectional view taken along line 15—15 of FIG. 14.

FIG. 15 is a sectional view taken along line 15—15 of FIG. 14, in which, when the side facing toward the punch 139 is called the first surface 132a, and the other side is called the second surface 132b, the pulsar ring 132 is attached with the second surface 132b directed toward the pulse counting sensor 100.

The pulse detecting hole 135 formed by punching with the punch 139 is provided with a sharp square edge 136a on the second surface 132b side (i.e., a part where a hole wall surface 135a of the pulse detecting hole 135 and the sensing surface 133a mutually intersect). Therefore, it is possible to clearly distinguish the sensing surface 133a from the pulse detecting hole 135. Therefore, the sensing performance of the pulse counting sensor 100 can be improved and accordingly the detecting accuracy of the wheel speed detecting device 130 can be enhanced.

Figure 16A:
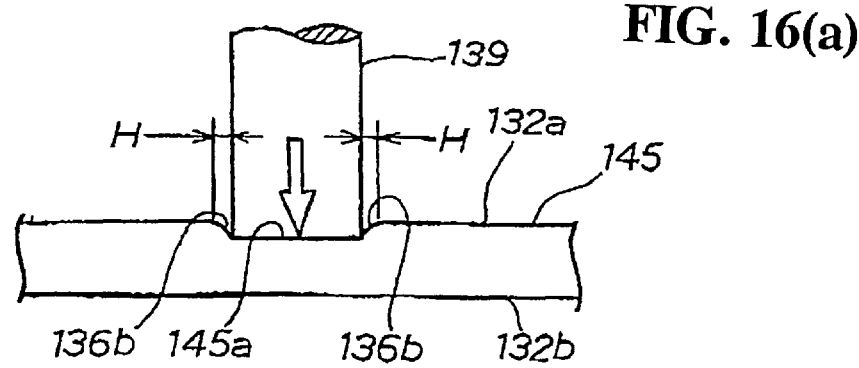
FIGS. 16(a) and 16(b) are explanatory views of a fabricating process of the wheel speed detecting device (the seventh embodiment) of the present invention.
Figure 16B:
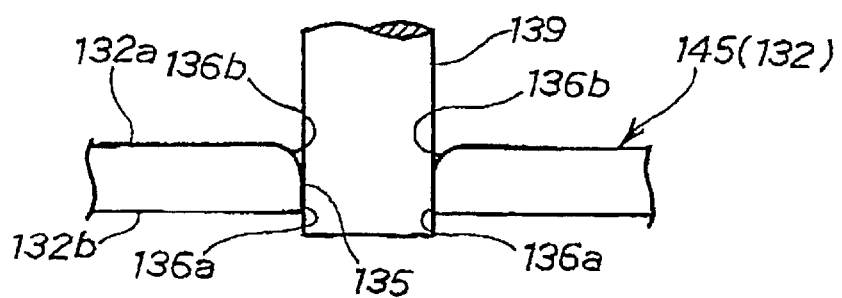

FIGS. 16(a) and 16(b) are explanatory views of a fabricating process for fabricating the wheel speed detecting device (the seventh embodiment) according to the present invention.

In FIG. 16(a), the punch 139 is set on the first surface 132a of the blank 145 and fed down into the first surface 132a.

As the punch 139 is driven downward into the first surface 132a, the first surface 132a is depressed. At this time, the first surface 132a is slightly depressed at an area within the range H along the outer surface of the punch 139, and there takes place a so-called "droop" 136b along the outer surface of the punch 139.

In FIG. 16(b), the pulsar ring 132 is obtained by punching the pulse detecting hole 135 in the blank 145 by the use of the punch 139. In punching the pulsar ring 132, the droop 136a occurs along the outer periphery of the pulse detecting hole 135 being made in the first surface 132a.

In the meantime, there takes place no droop along the outer periphery of the pulse detecting hole 135 being made in the second surface 132b where the punch 139 cuts through. Therefore, a sharp square cut detecting hole edge 136a is formed on the pulse detecting hole 135.

Figure 17A:
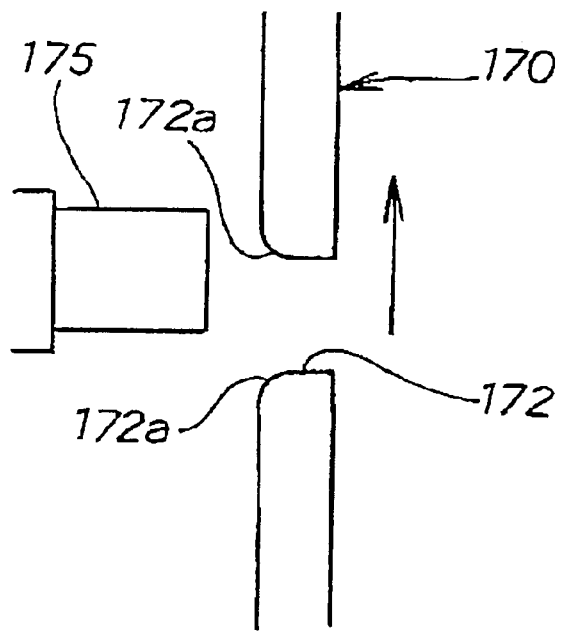
FIGS. 17(a) and 17(b) are explanatory views of operation of the wheel speed detecting device (the seventh embodiment) of the present invention.
Figure 17B:
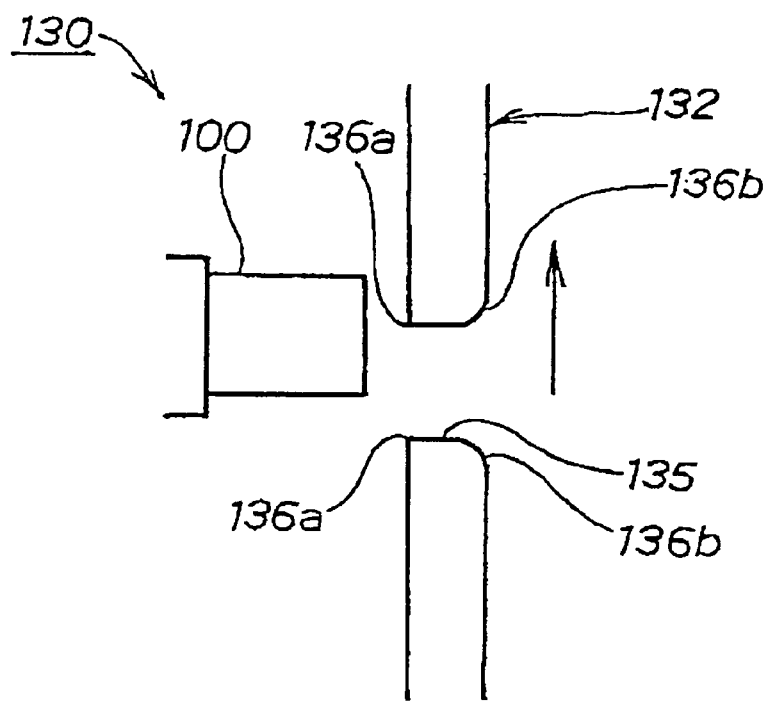

FIGS. 17(a) and 17(b) are explanatory views of operation of the wheel speed detecting device (the seventh embodiment) according to the present invention.

In FIG. 17(a), the pulse detecting hole 172 is detected by the pulse counting sensor 175 with the pulsar ring 170 turned in the direction of the arrow. In this case, since the droop 172a of the pulse detecting hole 172 is exposed to the pulse counting sensor 175, the pulse counting sensor 175 detects the depression of the droop 172a.

Therefore, the magnetic variation of the pulse counting sensor 100 becomes indefinite, resulting in a failure in accurate detection of the pulse detecting hole 172.

In FIG. 17(b), the pulse detecting hole 135 is detected by the pulse counting sensor 100 with the pulsar ring 132 turned in the direction of the arrow. The droop 136b of the pulse detecting hole 135 is positioned on the opposite side of the pulse counting sensor 100, and the detecting hole edge 136a faces toward the pulse counting sensor 100.

The detecting hole edge 136a is formed sharp and square in section, so that the pulse detecting hole 135 is clearly distinguishable from the sensing surface 133a, and accordingly can be accurately detected. Therefore, the magnetic variation of the pulse counting sensor 100 is made clear, enhancing the sensing performance by the pulse counting sensor 100 and accordingly improving the detecting accuracy of the wheel speed detecting device 130.

In the present embodiment is explained an example of the wheel speed detecting device applied to a motorcycle. It should be noticed, however, that the wheel speed detecting device is applicable to other types of motor vehicles as well.

In the example described above, it is to be noted that the pulse detecting hole 57 of the pulsar ring 52 is a slit and may be a round hole. Furthermore, a recess may be adopted in place of the pulse detecting hole.

Furthermore, heretofore explained is the adoption of the electromagnetic rotary sensor as the pulse counting sensor 60. In this case also, other types of sensors, such as a photo sensor, may be used.

It should be noticed that in the third to seventh embodiments the wheel speed detecting device applied to the rear wheel of a motorcycle has been explained, and the same effect is obtainable also when the wheel speed detecting device is applied to the front wheel of a motorcycle.

The present invention of the above-described configuration has the following advantages.

According to the first aspect of the present invention, the pulse detecting holes are formed in a radially inward position apart from the outer edge of the pulsar ring. Therefore, the outer edge of the pulsar ring can be left in a circular form. Therefore, it is possible to prevent pulsar ring warpage by the outer edge if the pulse detecting hole is made by pressing.

Consequently, the flatness of the pulsar ring can be kept within the permissible range, thereby lowering the pulsar ring cost.

Furthermore, the flatness of the pulsar ring that can be kept within the permissible range, the detecting accuracy of the wheel speed detecting device can be enhanced.

According to the second aspect, the rigidity of the sensing surface can be increased by forming the stiffening rib in the vicinity of, or on the back side of, the sensing surface. Consequently, it is possible to keep the flatness of the sensing surface within the permissible range if the plate thickness of the pulsar ring is set small, and accordingly to reduce the weight of the pulsar ring.

Furthermore, because the flatness of the pulsar ring can be kept within the permissible range, the detecting accuracy of the wheel speed detecting device can be improved.

According to the third aspect, the stiffening rib is provided along the sensing surface; and the stiffening rib has been increased in height larger than the distance from the sensing surface to the pulse counting sensor. Therefore, the clearance between the sensing surface and the pulse counting sensor can be covered with the stiffening rib, which is usable as a protective cover.

Therefore, since the clearance between the sensing surface and the pulse counting sensor is protected with the stiffening rib, it is possible to prevent entrance of a flying substance, such as a flying rock, into the clearance, and accordingly to enhance the detecting accuracy of the wheel speed detecting device.

Furthermore, because the stiffening rib is usable as a protective cover, no separate protective cover is needed; and therefore it is possible to prevent an increase in the component count, to dispense with protective cover installation, and therefore to lower cost.

According to the fourth aspect, the outer edge of the disc is bent to increase the rigidity of the pulsar ring, thereby improving disc quality and enabling wheel speed detection accuracy.

Furthermore, it is possible to prevent an increase in the plate thickness of the pulsar ring by increasing the rigidity of the pulsar ring. Consequently, cost reduction and enhanced vehicle performance are realized by reducing the weight of the pulsar ring.

According to the fifth aspect, when the pulsar ring is punched through from the first surface to the second surface, the edge portion of the punched hole in the first surface becomes round, while the edge portion of the punched hole in the second surface becomes sharp.

In the fifth aspect, therefore, the pulsar ring is placed with the second surface having the sharp edge facing toward the pulse counting sensor.

In the case of the pulsar ring having the sharp, square edge hole, the sensing performance of the pulse counting sensor can be improved. As a result, it is possible to enhance the detecting accuracy of the wheel speed detecting device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A wheel speed detecting device for a vehicle having a front wheel and a rear wheel, comprising:

a pulse counting sensor, said pulse counting sensor being mountable on a body side of the vehicle and facing one of said front wheel and said rear wheel; and a pulsar ring, said pulsar ring being mountable on a wheel side of the vehicle and coaxially with an axle of one of said front wheel and said rear wheel so as to directly face said pulse counting sensor, and including:
a disc; and
pulse detecting holes or pulse detecting recesses formed in said disc at predetermined pitches on a pitch circle drawn in a radially inward circumferential position spaced at a predetermined distance from an outer edge of said disc.

2. The wheel speed detecting device according to claim 1, wherein said disc has a sensing surface directed toward said pulse counting sensor, and at least one stiffening rib is provided near or on a back side of said sensing surface.

3. The wheel speed detecting device according to claim 2, wherein said stiffening rib is provided along said sensing surface, and a height of said stiffening rib from said sensing surface is larger than a clearance between said sensing surface and said pulse counting sensor.

4. The wheel speed detecting device according to claim 2, wherein said stiffening rib is formed by bending an outer edge of said disc.

5. The wheel speed detecting device according to claim 1, wherein said pulsar ring is a pressed part provided with punched pulse detecting holes, and wherein one side of said pulsar ring which faces toward a punch is called the first side and the other side is the second side, said pulsar ring being positioned such that said second surface faces said pulse counting sensor.

6. The wheel speed detecting device according to claim 2, wherein there are two of said at least one stiffening rib located on opposite sides of said pulse detecting holes or recesses.

7. The wheel speed detecting device according to claim 1, wherein said pulsar ring includes a seat plate and said disc, said seat plate and said disc being generally parallel to each other, and a cylindrical portion connecting said seat plate to said disc, said cylindrical portion being generally perpendicular to said seat plate and said disc.

8. The wheel speed detecting device according to claim 5, wherein said first side includes a rounded edge around each of said pulse detecting holes, and said second side includes a sharp edge around each of said pulse detecting holes.

9. The wheel speed detecting device according to claim 2, wherein said pulse detecting holes or recesses are recesses, and said at least one stiffening rib is located on a back side of said sensing surface spaced said predetermined distance from said outer edge of said disc.

10. A wheel speed detecting device mounted on a vehicle having a wheel mounted on a swing arm, comprising:

a pulse counting sensor, said pulse counting sensor being mounted on a swing arm of said vehicle and facing said wheel; and a pulsar ring, said pulsar ring being mounted on a hub of said wheel and coaxially with an axle of said wheel of said vehicle so as to directly face said pulse counting sensor, said pulsar ring including:
a disc; and
pulse detecting holes or pulse detecting recesses formed in said disc at predetermined pitches on a pitch circle drawn in a radially inward circumferential position spaced at a predetermined distance from an outer edge of said disc.

11. The wheel speed detecting device according to claim 10, wherein said disc has a sensing surface directed toward said pulse counting sensor, and at least one stiffening rib is provided near or on a back side of said sensing surface.

12. The wheel speed detecting device according to claim 11, wherein said stiffening rib is provided along said sensing surface, and a height of said stiffening rib from said sensing surface is larger than a clearance between said sensing surface and said pulse counting sensor.

13. The wheel speed detecting device according to claim 11, wherein said stiffening rib is formed by bending an outer edge of said disc.

14. The wheel speed detecting device according to claim 10, wherein said pulsar ring is a pressed part provided with punched pulse detecting holes, and wherein one side of said pulsar ring which faces toward a punch is called the first side and the other side is the second side, said pulsar ring being positioned such that said second surface faces said pulse counting sensor.

15. The wheel speed detecting device according to claim 11, wherein there are two of said at least one stiffening rib located on opposite sides of said pulse detecting holes or recesses.

16. The wheel speed detecting device according to claim 10, wherein said pulsar ring includes a seat plate and said disc, said seat plate and said disc being generally parallel to each other, and a cylindrical portion connecting said seat plate to said disc, said cylindrical portion being generally perpendicular to said seat plate and said disc.

17. The wheel speed detecting device according to claim 14, wherein said first side includes a rounded edge around each of said pulse detecting holes, and said second side includes a sharp edge around each of said pulse detecting holes.

18. The wheel speed detecting device according to claim 11, wherein said pulse detecting holes or recesses are recesses, and said at least one stiffening rib is located on a back side of said sensing surface spaced said predetermined distance from said outer edge of said disc.

* * * * *